United States Patent
Ogura et al.

(10) Patent No.: US 11,259,068 B2
(45) Date of Patent: Feb. 22, 2022

(54) INFORMATION PROCESSING SYSTEM

(71) Applicant: Sony Interactive Entertainment Inc., Tokyo (JP)

(72) Inventors: Takafumi Ogura, Chiba (JP); Masahiko Sato, Chiba (JP); Naoki Matsuoka, Tokyo (JP); Takashi Enokihara, Ibaraki (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/889,880

(22) Filed: Jun. 2, 2020

(65) Prior Publication Data

US 2020/0389692 A1 Dec. 10, 2020

(30) Foreign Application Priority Data

Jun. 10, 2019 (JP) .............................. JP2019-108030

(51) Int. Cl.
*H04N 21/422* (2011.01)
*H04N 21/436* (2011.01)

(52) U.S. Cl.
CPC ..... *H04N 21/42204* (2013.01); *H04N 21/436* (2013.01)

(58) Field of Classification Search
CPC ........................ H04N 21/42204; H04N 21/436
USPC ......................................................... 725/135
See application file for complete search history.

(56) References Cited

U.S. PATENT DOCUMENTS

| 5,157,782 A | 10/1992 | Tuttle |
| 2010/0167816 A1 | 7/2010 | Perlman |
| 2010/0269041 A1 | 10/2010 | Kintzley |
| 2011/0281645 A1 | 11/2011 | Wolfson |
| 2019/0272184 A1* | 9/2019 | Rubenfield ............... G06F 8/76 |

(Continued)

FOREIGN PATENT DOCUMENTS

| EP | 1619614 A1 | 1/2006 |
| EP | 1967238 A1 | 9/2008 |
| JP | 53005904 A | 1/1978 |

(Continued)

OTHER PUBLICATIONS

Extended European Search Report for corresponding EP Application No. 20177869.3, 15 pages, dated Oct. 15, 2020.

(Continued)

*Primary Examiner* — Dominic D Saltarelli
(74) *Attorney, Agent, or Firm* — Matthew B. Dernier, Esq.

(57) ABSTRACT

There is provided an information processing system including an inputting apparatus connected to a target apparatus that executes a process according to a manipulation of a user, and a control apparatus connected to the inputting apparatus, in which the control apparatus transmits a plurality of manipulation data prepared in advance and individually indicative of manipulation contents of the user to the inputting apparatus in order one by one, and the inputting apparatus transmits in order one by one the manipulation data transmitted from the control apparatus to the target apparatus at time intervals corresponding to time intervals at which contents of the manipulation are accepted in a case in which the target apparatus executes a process according to a manipulation of the user.

14 Claims, 5 Drawing Sheets

(56) References Cited

U.S. PATENT DOCUMENTS

2020/0251031 A1     8/2020   Pedeville et al.

FOREIGN PATENT DOCUMENTS

| JP | 56147205 | A | 11/1981 |
|---|---|---|---|
| JP | 57182123 | A | 11/1982 |
| JP | 03102536 | A | 4/1991 |
| JP | 2003316577 | A | 11/2003 |
| JP | 2010034644 | A | 2/2010 |
| JP | 2014049005 | A | 3/2014 |
| JP | 2017049773 | A | 3/2017 |

OTHER PUBLICATIONS

Cyrille Wagner, Gamasutra—Features—"Developing You Own Replay System", Gama Networks, Shadows in Darkness, 11 pages, URL:http://www.gamasutra.com/features/20040204/wagner 01.shtml Feb. 4, 2004.

Patrick Dickinson, Gamasutra.com "Instant Replay: Building a Game Engine with Reproducible Behavior" Gama Networks, 6 pages, URL:http://www.gamasutra.comjfeatures/20010713/dickinson 01.htm, Jul. 13, 2001.

Olaf Boehm et al., "Amiga Action Replay III" Datel Electronics Ltd., 63 pages, URL:http://amiga.resource.cxjmanual/ActionReplayMk3.pdf, Jan. 1, 1991.

Justesen Niels et al., "Deep Learning for Video Game Playing" IEEE Transactions on Games, vol. 12, No. 1, pp. 1-20, Feb. 13, 2019.

Cho Ho-Chul, et al., "Replay-based strategy prediction and build order adaptation for StarCraft AI bots" IEEE Conference on Computational Intelligence in Games, pp. 1-7, Aug. 11, 2013.

Notice of Reasons for Refusal for corresponding JP Application No. 2019-108030, 8 pages, dated May 28, 2021.

\* cited by examiner

INFORMATION PROCESSING SYSTEM

CROSS REFERENCE TO RELATED APPLICATION

This application claims the benefit of Japanese Priority Patent Application JP 2019-108030 filed Jun. 10, 2019, the entire contents of which are incorporated herein by reference.

BACKGROUND

The present technology disclosed herein relates to an information processing system, an inputting apparatus, a control apparatus, an information processing method and a program.

Generally, a user whose uses an information processing apparatus performs various manipulations for a manipulation apparatus to cause the information processing apparatus to execute a desired process. For example, in the field of computer games and so forth, it is sometimes wanted to record contents of a manipulation performed for a manipulation apparatus by a user and cause the information processing apparatus to execute processing according to the manipulation contents later. Further, it is sometimes wanted to cause the information processing apparatus to execute a process, which is to be executed in the case where the user performs some manipulation, without causing the user to actually perform such manipulation. In the case where it is wanted to cause the information processing apparatus to execute a process according to contents of a manipulation of the user without using an actual manipulation of the user as a trigger in this manner, it is conceivable to record, into the information processing apparatus, data representative of contents of a manipulation performed (or supposed to be performed) for a manipulation apparatus and then read out the recorded data to execute processing. This makes it possible to reproduce the manipulation contents of the user without using an actual manipulation of the user as a trigger.

SUMMARY

If it is tried to use the data recorded in the information processing apparatus to reproduce manipulation contents of the user as described above, then in comparison with an alternative case in which processing is executed directly in response to manipulation contents accepted by the manipulation apparatus, it may become necessary to execute an additional process in the inside of the information processing apparatus in order to reproduce the manipulation contents. Therefore, a difference occurs with an operation environment and so forth from those in the case where such an additional process is not performed, and this sometimes makes it difficult to accurately reproduce manipulation contents.

The present technology has been made taking such actual circumstances as described above. It is desirable to provide an information processing system, an inputting apparatus, a control apparatus, an information processing method and a program that are capable of reproducing manipulation contents of a user with a comparatively high degree of accuracy without taking an actual manipulation of the user as a trigger.

According to an embodiment of the present technology, there is provided an information processing system including an inputting apparatus connected to a target apparatus that executes a process according to a manipulation of a user and a control apparatus connected to the inputting apparatus, in which the control apparatus transmits a plurality of manipulation data prepared in advance and individually indicative of manipulation contents of the user to the inputting apparatus in order one by one, and the inputting apparatus transmits in order one by one the manipulation data transmitted from the control apparatus to the target apparatus at time intervals corresponding to time intervals at which contents of the manipulation are accepted in a case in which the target apparatus executes a process according to a manipulation of the user.

According to another embodiment of the present technology, there is provided an inputting apparatus that is connected to a target apparatus that executes a process according to a manipulation of a user and a control apparatus, in which the inputting apparatus receives a plurality of manipulation data prepared in advance and individually indicative of manipulation contents of the user in order one by one from the control apparatus, and transmits the manipulation data transmitted from the control apparatus to the target apparatus in order one by one at time intervals corresponding to time intervals at which, in a case where the target apparatus executes a process according to a manipulation of the user, contents of the manipulation are accepted.

According to a further embodiment of the present technology, there is provided a control apparatus connected to an inputting apparatus connected to a target apparatus that executes a process according to a manipulation of a user, the inputting apparatus including a transmitter for transmitting a plurality of manipulation data prepared in advance and individually indicative of manipulation contents of the user to the inputting apparatus in order one by one, in which the transmitter transmits the plurality of manipulation data in order at time intervals corresponding to time intervals at which, where the target apparatus executes a process according to the manipulation of the user, contents of the manipulation are accepted.

According to a still embodiment of the present technology, there is provided an information processing method executed by a control apparatus connected to an inputting apparatus connected to a target apparatus that executes a process according to a manipulation of a user, the information processing method including transmitting a plurality of manipulation data in order one by one to the inputting apparatus, the plurality of manipulation data being prepared in advance and individually indicative of manipulation contents of the user, in which the transmitting the plurality of manipulation data at time intervals corresponding to time intervals at which, where the target apparatus executes a process according to the manipulation of the user, contents of the manipulation are accepted.

According to a yet further embodiment of the present technology, there is provided a program for causing a computer connected to an inputting apparatus connected to a target apparatus that executes a process according to a manipulation of a user to execute a transmission procedure of transmitting a plurality manipulation data prepared in advance and individually indicative of manipulation contents of the user to the inputting apparatus in order one by one, in which, in the transmission procedure, the plurality of manipulation data are transmitted at time intervals corresponding to time intervals at which, where the target apparatus executes a process according to the manipulation of the user, contents of the manipulation are accepted. This program may be stored in and provided as a computer-readable non-transitory information processing medium.

DETAILED DESCRIPTION OF THE PREFERRED EMBODIMENT

In the following, an embodiment of the present technology is described in detail with reference to the accompanying drawings.

Figure 1:
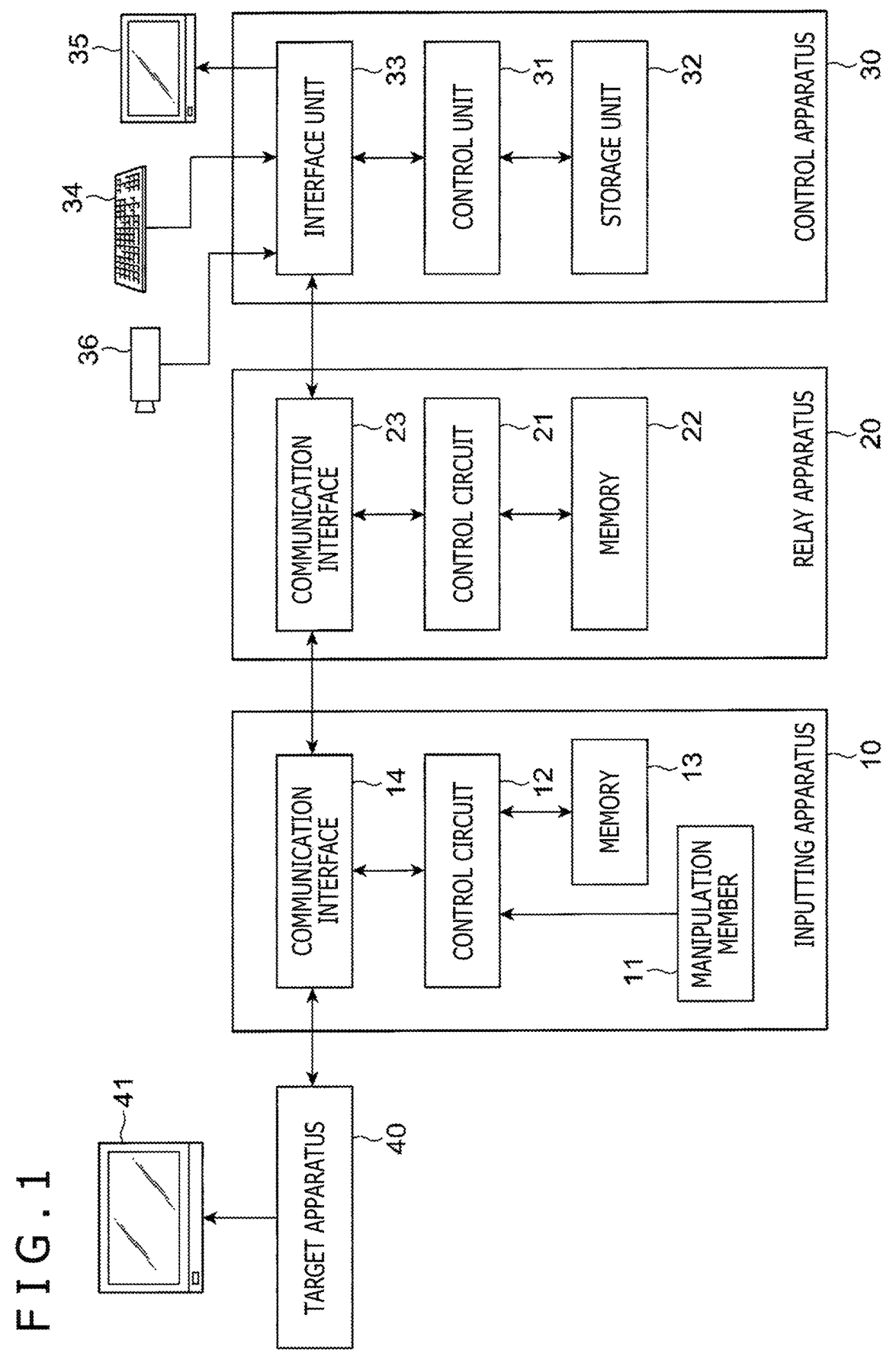
FIG. 1 is a configuration block diagram depicting a general configuration of an information processing system according to an embodiment of the present technology.

FIG. 1 is a configuration block diagram depicting a general configuration of an information processing system 1 according to the embodiment of the present technology. As depicted in FIG. 1, the information processing system 1 is configured including an inputting apparatus 10, a relay apparatus 20 and a control apparatus 30. Further, the information processing system 1 is connected to a target apparatus 40. The target apparatus 40 is an information processing apparatus such as, for example, a home-use game machine or a personal computer, and a display apparatus 41 is connected to the target apparatus 40. The display apparatus 41 is, for example, a liquid crystal display and displays a screen image according to a result of processing executed by the target apparatus 40.

The information processing system 1 according to the present embodiment is used in order to cause the target apparatus 40 to execute a process according to manipulation contents of a user without taking a manipulation of the user as a trigger. In particular, it is supposed that the target apparatus 40 is normally connected to and used together with a manipulation apparatus of a predetermined type (hereinafter referred to as target manipulation apparatus), and the user of the target apparatus 40 would perform various manipulations for the target manipulation apparatus to cause the target apparatus 40 to execute a desired process. The target manipulation apparatus may be, for example, a controller for exclusive use for a home-use game machine. The information processing system 1 according to the present embodiment is used to reproduce manipulation contents of a user by causing the target apparatus 40 to execute a process, which is to be executed by the target apparatus 40 in the case where the user performs some manipulation (hereinafter referred to as reproduction target manipulation) for the target manipulation apparatus, without taking an actual manipulation of the user as a trigger.

The inputting apparatus 10 is used to actually accept a reproduction target manipulation from the user and input data indicative of contents of the reproduction target manipulation to the target apparatus 40. In particular, the inputting apparatus 10 is configured including one or a plurality of manipulation members 11, a control circuit 12, a memory 13 and a communication interface 14. Further, the inputting apparatus 10 may include, in the inside thereof, various sensors for detecting a state of the inputting apparatus 10.

The manipulation members 11 are members for accepting a manipulation of the user and may include various members such as a button, a touch pad or a tilt manipulation member for being manipulated with tilting. It is to be noted that the inputting apparatus 10 includes manipulation members similar to those of the target manipulation apparatus. Further, the inputting apparatus 10 itself may have a shape and a structure similar to those of the target manipulation apparatus, and the manipulation member 11 may be provided at a position same as that in the target manipulation apparatus. This makes it possible for the user to manipulate the manipulation member 11 with a manipulation feeling similar to that of the target manipulation apparatus. Furthermore, if the target manipulation apparatus includes an interface corresponding to the communication interface 14 hereinafter described, then the inputting apparatus 10 may have a hardware configuration same as that of the target manipulation apparatus.

The control circuit 12 is an integrated circuit or a like circuit and executes a process for controlling operation of the entire inputting apparatus 10 in accordance with a firmware program or a like program prepared in advance. Especially, in the present embodiment, the control circuit 12 processes data indicative of contents of a manipulation executed for the manipulation member 11 by the user (such data is hereinafter referred to as manipulation data D). Contents of control executed by the control circuit 12 in the present embodiment are hereinafter described. The memory 13 is a random access memory (RAM) or the like and temporarily stores manipulation data D and so forth. It is to be noted that the memory 13 may otherwise be built in the control circuit 12.

The communication interface 14 is an interface for transmitting and receiving data to and from the target apparatus 40 and the relay apparatus 20. The inputting apparatus 10 is connected to the target apparatus 40 by an interface of a standard same as that of the interface for connecting the target manipulation apparatus to the target apparatus 40. In particular, for example, the inputting apparatus 10 is connected to the target apparatus 40 by wire connection and transmits manipulation data D in accordance with a standard such as a universal serial bus (USB) standard to the target apparatus 40 through the communication interface 14. Alternatively, the inputting apparatus 10 may be connected to the target apparatus 40 by wireless connection. Since the inputting apparatus 10 is connected to the target apparatus 40 by an interface similar to that of the target manipulation apparatus, the target apparatus 40 can accept manipulation data D from the inputting apparatus 10 similarly as in the case where the target manipulation apparatus is connected thereto.

Further, the inputting apparatus 10 is connected to the relay apparatus 20 through the communication interface 14. Communication between the inputting apparatus 10 and the relay apparatus 20 may be performed by a standard same as that of communication between the inputting apparatus 10 and the target apparatus 40, and the communication also may be performed by a different standard. However, the data transmission rate between the inputting apparatus 10 and the relay apparatus 20 preferably is equal to or higher than at least the data transfer rate between the inputting apparatus 10 and the target apparatus 40. In particular, the communication interface 14 may include a communication circuit such as a universal asynchronous receiver/transmitter (UART) such that it performs transmission and reception of data to and from the relay apparatus 20 by the communication circuit.

The relay apparatus 20 is an apparatus that relays data between the inputting apparatus 10 and the control apparatus 30 and is configured including a control circuit 21, a memory 22 and a communication interface 23.

The control circuit 21 is an integrated circuit or a like circuit and executes a process for controlling operation of the entire of the relay apparatus 20 in accordance with a firmware program or a like program prepared in advance. Especially, in the present embodiment, the control circuit 21 performs a process for relaying data between the inputting apparatus 10 and the control apparatus 30. Contents of control executed by the control circuit 21 in the present embodiment are hereinafter described. The memory 22 is a RAM or a like device and temporarily stores data or the like that is made a relay target. It is to be noted that the memory 22 may otherwise be built in the control circuit 21.

The communication interface 23 is an interface for transmitting and receiving data to and from the inputting apparatus 10 and the control apparatus 30. The interface for transmitting and receiving data to and from the relay apparatus 20 and the control apparatus 30 may be any interface. However, by using the interface between the relay apparatus 20 and the control apparatus 30 same as the interface between the inputting apparatus 10 and the target apparatus 40, the communication interface 14 provided in the inputting apparatus 10 and the communication interface 23 provided in the relay apparatus 20 can be made in a similar configuration. This makes it possible for a device having a hardware configuration similar to that of the inputting apparatus 10 to function as the relay apparatus 20.

The control apparatus 30 is an information processing apparatus such as, for example, a personal computer and includes a control unit 31, a storage unit 32 and an interface unit 33. Further, to the control apparatus 30, a manipulation device 34, a display apparatus 35 and a camera 36 are connected.

The control unit 31 includes at least one processor such as a central processing unit (CPU) and executes various information processes in accordance with a program stored in the storage unit 32. Contents of the processes executed by the control unit 31 in the present embodiment are hereinafter described. The storage unit 32 includes at least one memory device such as a RAM and stores a program to be executed by the control unit 31 and data that become a processing target of the control unit 31.

The interface unit 33 is an interface for transmitting and receiving data to and from the relay apparatus 20 and may include a communication circuit for transmitting and received data to and from the relay apparatus 20, for example, by the USB. Further, the interface unit 33 performs transmission and reception of data to and from the manipulation device 34, display apparatus 35 and camera 36.

The manipulation device 34 includes a keyboard and so forth and accepts a manipulation input to the control apparatus 30. The display apparatus 35 is a liquid crystal display or a like display and displays a result of processing executed by the control apparatus 30. Meanwhile, the camera 36 is a device for capturing a moving picture and captures a screen image of the display apparatus 41 connected to the target apparatus 40.

In the following, functions implemented by the information processing system 1 according to the present embodiment are described. The information processing system 1 operates in one of a plurality of operation modes including a manipulation recording mode, a record reproduction mode and a predetermined manipulation reproduction mode. Flows of processing executed by the individual apparatus in the operation modes are described in order below.

Figure 2:
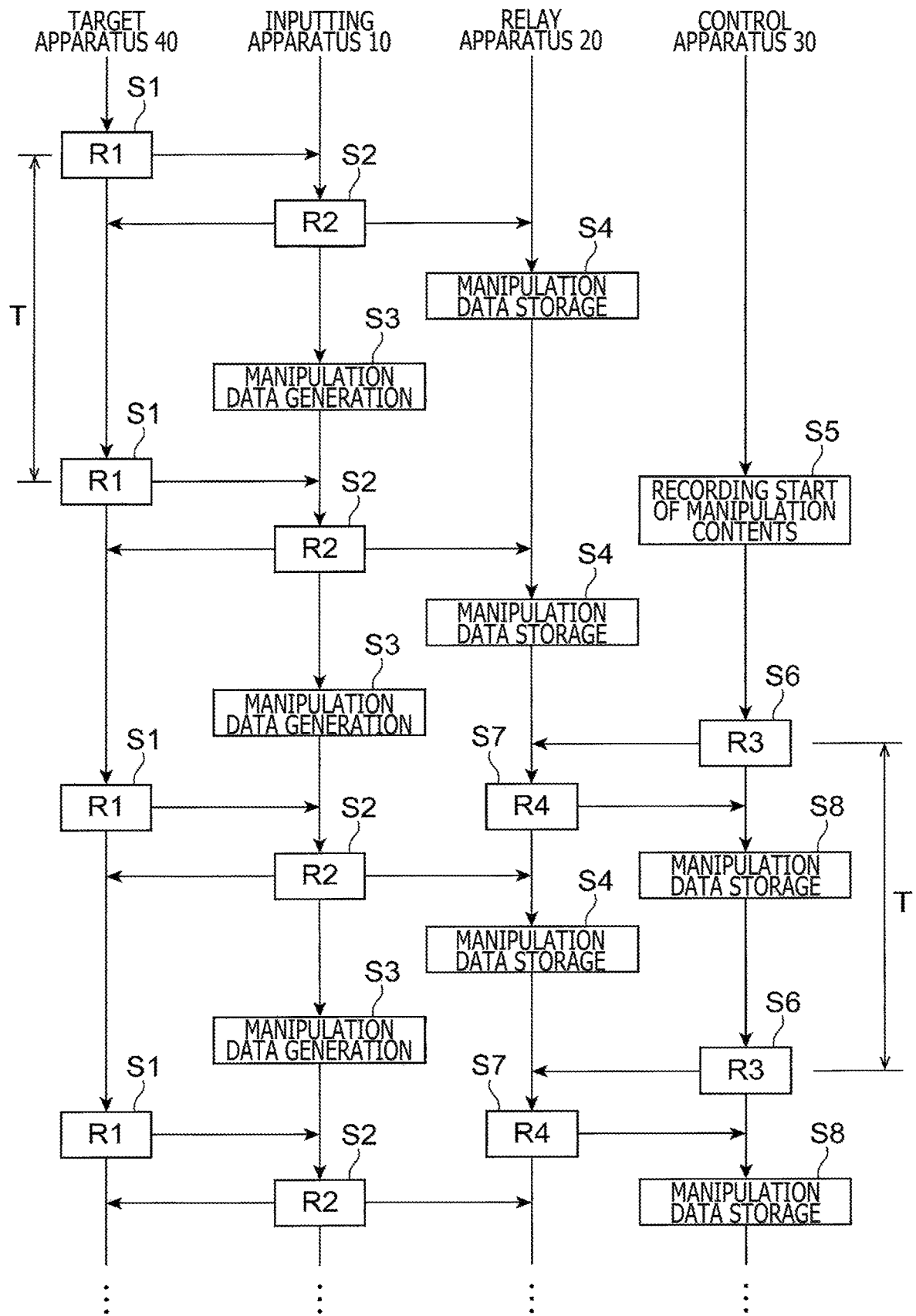
FIG. 2 is a sequence diagram depicting a flow of processing in a manipulation recording mode.

First, a flow of processing in the manipulation recording mode is described with reference to a sequence diagram of FIG. 2. The manipulation recording mode is an operation mode for allowing the control apparatus 30 to record contents of a manipulation actually performed for the inputting apparatus 10 by the user as manipulation data D.

The target apparatus 40 transmits an acquisition request R1 for acquiring manipulation data D latest at the point of time to the inputting apparatus 10 at predetermined time intervals regardless of the operation mode (S1). In the following, the time interval after which the target apparatus 40 transmits an acquisition request R1 to the inputting apparatus 10 is referred to as acquisition interval T.

When the acquisition request R1 from the target apparatus 40 is accepted, the control circuit 12 of the inputting apparatus 10 transmits the latest manipulation data D stored in the memory 13 at the point of time as a response R2 to the acquisition request R1 to the target apparatus 40 (S2). At this time, the inputting apparatus 10 transmits, at a timing same as the timing at which it transmits the manipulation data D to the target apparatus 40, the manipulation data D of the same contents to the relay apparatus 20. In short, the inputting apparatus 10 transmits, as the response R2 to the acquisition request R1, the same manipulation data D in parallel to both of the target apparatus 40 and the relay apparatus 20.

Further, the inputting apparatus 10 thereafter scans the state of the manipulation members 11 at the current point of time to generate new manipulation data D and stores the manipulation data D into the memory 13 (S3). The manipulation data D generated in S3 are transmitted as a response R2 to the target apparatus 40 when an acquisition request R1 is accepted next. Note that it is assumed that the recording process in S3 is completed in a period of time shorter than the acquisition interval T. In other words, every time a response R2 is transmitted, the manipulation data D in the memory 13 is updated to contents that reflect the latest step.

The processes in S1 to S3 described above are executed repeatedly after every acquisition interval T. The processes in S1 to S3 are processes similar to those in a case in which the target manipulation apparatus is connected to the target apparatus 40, namely, in the case where the target apparatus 40 is used with a configuration that is originally supposed. Further, the manipulation data D transmitted from the inputting apparatus 10 to the target apparatus 40 are data of a format same as that of the manipulation data D that are transmitted from the target manipulation apparatus to the target apparatus 40. Therefore, the target apparatus 40 need not execute an additional process in the inside thereof or need not include a special interface, and can receive manipulation data D from the inputting apparatus 10 and execute a process according to manipulation contents by the user indicated by the received manipulation data D.

The relay apparatus 20 receives the manipulation data D transmitted in S2 and stores the manipulation data D received before the number of such manipulation data D reaches a predetermined number (that may be equal to or greater than 2) in the reception order into the memory 22 (S4). After the predetermined number is reached, the relay apparatus 20 deletes the manipulation data D in order beginning with data that is older in reception timing. In other words, the relay apparatus 20 buffers the manipulation data D received from the inputting apparatus 10 in a first-in first-out fashion into the memory 22 until the predetermined number is reached.

It is assumed that the processes of the inputting apparatus 10 and the relay apparatus 20 described above are executed automatically in a default state. Independently of the flow of processing, the control apparatus 30 starts recording of the manipulation contents in response to an instruction from the user (S5). After recording of the manipulation contents is started, the control apparatus 30 transmits an acquisition request R3 for manipulation data D to the relay apparatus 20 at the acquisition intervals T (S6).

After the acquisition request R3 from the control apparatus 30 is accepted, the control circuit 21 of the relay apparatus 20 transmit the oldest manipulation data D from among the manipulation data D buffered at the point of time as a response R4 to the acquisition request R3 to the control apparatus 30 (S7). Note that it is assumed that the relay apparatus 20 deletes the data D transmitted as the response R4 to the control apparatus 30 from within the memory 22.

The control apparatus 30 stores the manipulation data D transmitted in S7 into the storage unit 32 (S8). The processes in S6 to S8 described above are repeatedly executed at the acquisition intervals T until the user instructs the control apparatus 30 to end recording, and consequently, the control apparatus 30 can record a plurality of manipulation data D in the order in which they are transmitted from the inputting apparatus 10. The data are fully same as the manipulation data D transmitted in order from the inputting apparatus 10 to the target apparatus 40. Note that it is supposed that, since the relay apparatus 20 buffers a plurality of manipulation data D, the timing at which manipulation data D transmitted from the inputting apparatus 10 arrives at the control apparatus 30 is later than a timing at which the target apparatus 40 receives the same manipulation data D. However, where the relay apparatus 20 buffers a plurality of manipulation data D and the control apparatus 30 sequentially acquires the manipulation data D from the relay apparatus 20 at time intervals corresponding to the acquisition intervals T at which the target apparatus 40 transmits an acquisition request R1, even if the reception time delays, the control apparatus 30 can receive and record the manipulation data D transmitted to the target apparatus 40 after a certain point of time fully in the same order. Especially, where the relay apparatus 20 typically buffers a plurality of manipulation data D, even in such a case that a delay occurs with communication between the relay apparatus 20 and the control apparatus 30, acquisition miss of the manipulation data D can be prevented.

In the case where manipulation data D of a reproduction target manipulation are to be recorded, the user would first instruct the control apparatus 30 to start the manipulation recording mode and then perform a manipulation to be recorded (namely, a reproduction target manipulation) for the inputting apparatus 10 while the target apparatus 40 is caused to operate actually. After the reproduction target manipulation is performed, the user would instruct the control apparatus 30 to end the manipulation recording mode. Consequently, a plurality of manipulation data D including contents of a series of reproduction target manipulations is recorded into the control apparatus 30. In the following, a set of a plurality of manipulation data D including contents of a series of reproduction target manipulations is hereinafter referred to as a manipulation data set DS, the manipulation data set DS being recorded by an operation of the manipulation recording mode.

Figure 3:
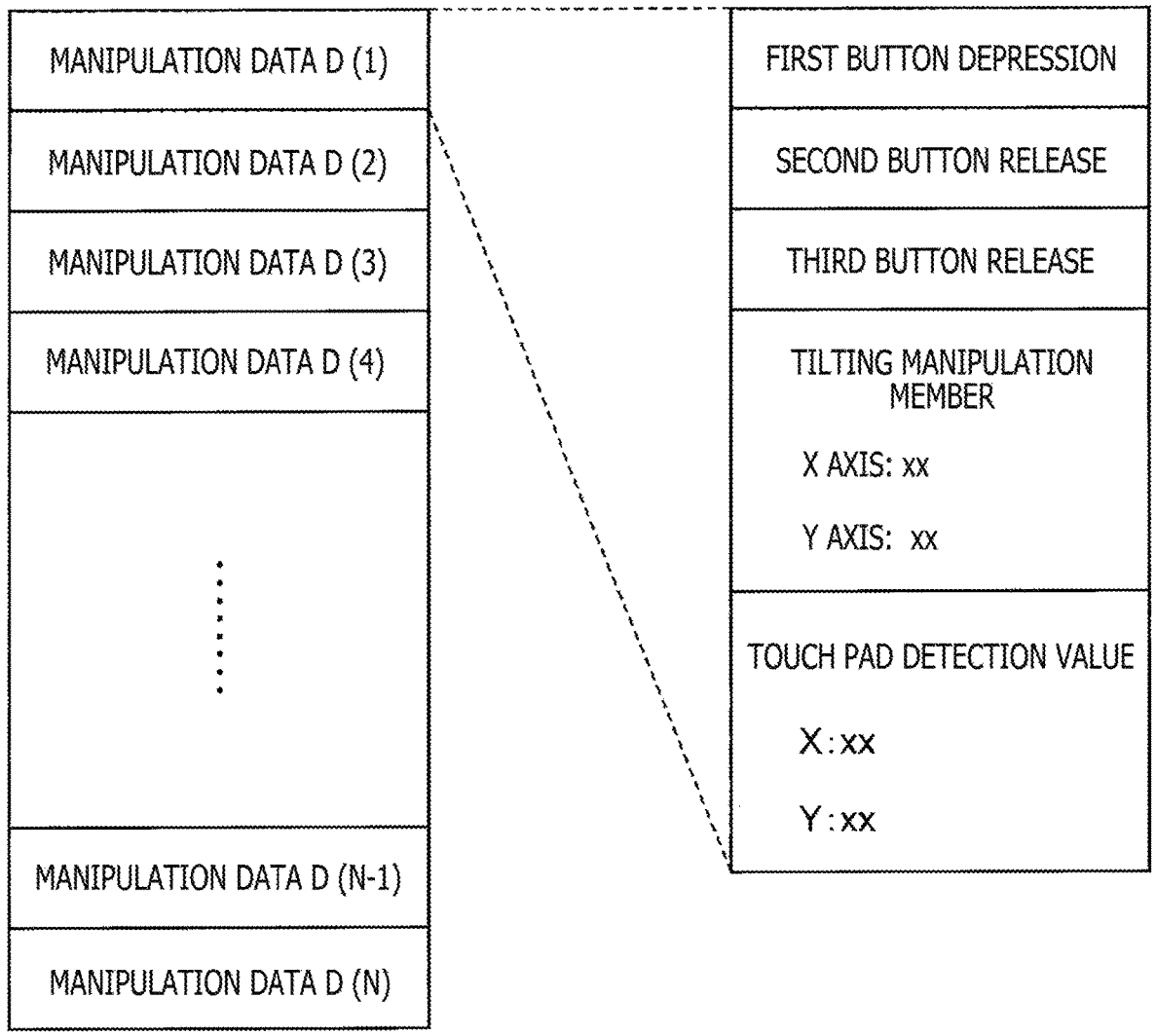
FIG. 3 is a view depicting a configuration of a manipulation data set recorded in the manipulation recording mode.

FIG. 3 depicts a configuration of the manipulation data set DS that is recorded into the control apparatus 30 in the manipulation recording mode. As depicted in FIG. 3, the manipulation data set DS includes a plurality of manipulation data D received by the control apparatus 30 at the acquisition intervals T within a period from start of recording till end of recording in order along a time series. In the example of FIG. 3, N manipulation data D from manipulation data D(1) to manipulation data D(N) are recorded. Each of the manipulation data D includes data indicative of manipulation contents of the user for the manipulation members 11 at a point of time at which the manipulation data D is generated in the inputting apparatus 10. Here, as an example, information indicative of whether or not each of a plurality of manipulation buttons that is disposed on a casing surface of the inputting apparatus 10 is depressed, information indicative of in which direction by what amount the tilt manipulation member is tilted, and coordinate values detected by the touch pad and so forth are included in the manipulation data D. Furthermore, the manipulation data D may include manipulation contents of the user for the manipulation member 11, and information indicative of detection values of the sensors such as an acceleration sensor provided in the inputting apparatus 10 and information relating to an internal state of the inputting apparatus 10 (for example, information indicative of a remaining level of a battery, presence or absence of connection of an external apparatus and so forth).

Figure 4:
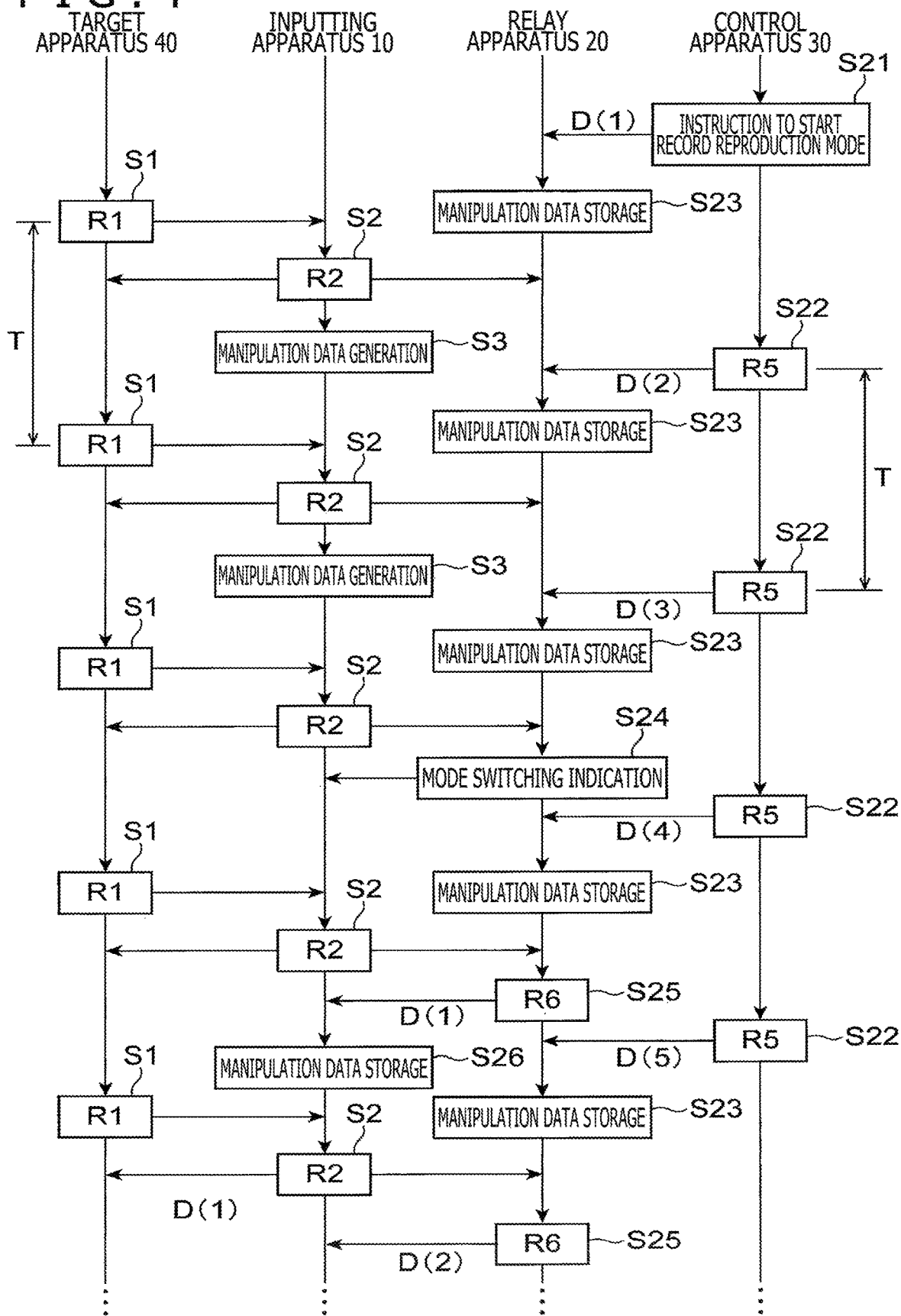
FIG. 4 is a sequence diagram depicting a flow of processing in a record reproduction mode.

Now, a flow of processing executed by the information processing system 1 in the record reproduction mode is described with reference to a sequence diagram of FIG. 4. The record reproduction mode is an operation mode for reproducing contents of a reproduction target manipulation using a manipulation data set DS recorded in the control apparatus 30 in the manipulation recording mode. In this record reproduction mode, the control apparatus 30 transmits a plurality of manipulation data D included in the manipulation data set DS recorded in the manipulation recording mode in order one by one to the inputting apparatus 10 through the relay apparatus 20. The inputting apparatus 10 transmits the manipulation data D transmitted thereto from the control apparatus 30 one by one in the order in which the manipulation data D have been transmitted from the control apparatus 30 to the target apparatus 40. Consequently, it is possible to reproduce contents of a manipulation actually performed by the user in the manipulation recording mode and cause the target apparatus 40 to execute a process according to the manipulation contents.

In particular, if the user instructs the control apparatus 30 to start operation in the record reproduction mode, then the control apparatus 30 transmits a control command for instructing the relay apparatus 20 to start operation in the record reproduction mode (S21). At this time, the control apparatus 30 transmits first manipulation data D(1) from among a plurality of manipulation data D included in the manipulation data set DS together with the control information. Thereafter, the control apparatus 30 executes a transmission process R5 of transmitting the plurality of manipulation data D included in the manipulation data set DS recorded therein in order to the relay apparatus 20 (S22). Here, it is assumed that the control apparatus 30 executes the transmission process R5 at time intervals corresponding to the acquisition interval T.

The control apparatus 30 repeatedly executes the transmission process of the manipulation data set DS until it accepts an instruction to end the record reproduction mode from the user or transmission of all manipulation data D included in the manipulation data set DS finishes. It is to be noted that, after all of the series of manipulation data D are transmitted, the control apparatus 30 may not end the record reproduction mode but may repeatedly execute the transmission process of the manipulation data set DS returning to the first manipulation data D(1) until an instruction to end the record reproduction mode is accepted. Alternatively, the transmission process of the manipulation data set DS may be continued until a predetermined ending condition is satisfied such that the transmission process of the manipulation data D is repeated by a number of times designated in advance or the transmission process of the manipulation data set DS is repeated until a period of time designated in advance elapses.

The relay apparatus 20 temporarily stores and buffers a plurality of received manipulation data D into and in the memory 22 until the number of manipulation data D transmitted from the control apparatus 30 reaches the predetermined number (S23). In the example of FIG. 4, three manipulation data D are buffered. It is to be noted that the relay apparatus 20 stores the manipulation data D transmitted from the control apparatus 30 into a predetermined region secured in the memory 22.

While the processes in S21 to S23 described above are performed, since the target apparatus 40 is not influenced by the operation mode of the information processing system 1, it continues to transmit an acquisition request R1 for manipulation data D to the inputting apparatus 10 at the acquisition intervals T similarly as in the case of the manipulation recording mode (S1). In the default state, the inputting apparatus 10 scans the state of the inputting apparatus 10 itself and transmits the manipulation data D generated in S3 as a response R2 to the acquisition request R1 of the target apparatus 40 to the target apparatus 40 and the relay apparatus 20 as described hereinabove (S2). The relay apparatus 20 stores the manipulation data D transmitted from the inputting apparatus 10 by the response R2 into a region in the memory 22 different from the region in which the manipulation data D transmitted from the control apparatus 30 described hereinabove are stored. Here, after the relay apparatus 20 accepts an instruction to start a record reproduction mode in S21, it interrupts storage of the manipulation data D transmitted from the inputting apparatus 10 in S2 into the memory 22. Then, after the predetermined number of manipulation data D are stored into the memory 22 in S23, the relay apparatus 20 transmits, at a timing at which it accepts manipulation data D transmitted in S2 after then, a control command for the instruction to switch to the record reproduction mode as a response R6 to the transmission in S2 to the inputting apparatus 10 (S24). The inputting apparatus 10 receives this control command and starts operation in the record reproduction mode.

In the record reproduction mode, the inputting apparatus 10 does not execute such a generation process (S3) of the manipulation data D by the inputting apparatus 10 itself as in the case of the manipulation recording mode but transmits the manipulation data D received from the relay apparatus 20 as a response R2 to the acquisition request R1 from the target apparatus 40. In particular, after the inputting apparatus 10 accepts the acquisition request R1, it transmits the manipulation data D stored in the memory 13 as a response R2 similarly as in the case of the default state (S2). This response R2 is also transmitted to the relay apparatus 20. The relay apparatus 20 transmits the oldest manipulation data D from among the plurality of manipulation data D buffered in S23 as a response R6 to the transmission from the inputting apparatus 10 (S25). At this time, the relay apparatus 20 deletes the transmitted manipulation data D from the memory 22.

The inputting apparatus 10 stores the manipulation data D included in the response R6 in S25 as manipulation data D to be transmitted to the target apparatus 40 into the memory 13 (S26). Note that it is assumed that the processes in S25 and S26 are completed in a shorter period of time than the acquisition interval T.

According to the processes described above, after switching to the record reproduction mode, the inputting apparatus 10 transmits manipulation data D received from the control apparatus 30 through the relay apparatus 20 one by one to the target apparatus 40 every time it receives the acquisition request R1. Consequently, the target apparatus 40 can receive a manipulation data set DS same as the series of manipulation data set DS accepted from the inputting apparatus 10 when the reproduction target manipulation is performed in a same order at same time intervals in an operation environment similar to that when the user performs the reproduction target manipulation in the manipulation recording mode. Therefore, in the record reproduction mode, despite that the user does not perform any manipulation for the inputting apparatus 10, it is possible to cause the target apparatus 40 to execute, assuming that a reproduction target manipulation has been performed, a process according to contents of the manipulation. By this record reproduction mode, it is possible to implement an operation test for confirming a behavior of the target apparatus 40 in the case where, for example, a same manipulation is repeated by a plural number of times without repeating an actual manipulation by a plural number of times.

Further, also in the record reproduction mode, by performing relaying while the relay apparatus 20 performs buffering of a plurality of manipulation data D similarly as in the manipulation recording mode, the data are continuously transmitted to the target apparatus 40 similarly as upon manipulation recording while preventing miss of the manipulation data D to be inputted to the target apparatus 40.

Now, contents of processing executed by the control apparatus 30 in the predetermined manipulation reproduction mode are described. In this predetermined manipulation reproduction mode, similarly as in the record reproduction mode, manipulation data D supplied from the outside are inputted to the target apparatus 40 such that the target apparatus 40 executes a desired process without a manipulation performed for the inputting apparatus 10 by the user. However, different from the case in the record reproduction mode, the control apparatus 30 does not sequentially transmit the manipulation data D recorded in the manipulation recording mode but starts a process for transmitting a plurality of manipulation data D prepared in advance at a timing determined in response to a progress of processing executed by the target apparatus 40. Consequently, a user manipulation can be reproduced in accordance with the progress of processing executed by the target apparatus 40.

In particular, in the predetermined manipulation reproduction mode, it is assumed that a plurality of manipulation data sets DS is created in advance and recorded in the control apparatus 30. An order for transmission is determined for the plurality of manipulation data sets DS. Each manipulation data set DS is configured from one or a plurality of manipulation data D. In particular, one manipulation data set DS may be configured from one or a plurality of manipulation data D to be transmitted repeatedly. Alternatively, one manipulation data set DS may be configured from manipulation data D to be transmitted once and manipulation data D to be transmitted repeatedly. Where a manipulation data set DS includes manipulation data D to be transmitted repeatedly, transmission of data D based on one manipulation data set DS can be executed continuously until a timing at which a transmission process of a next manipulation data set DS is to be started comes.

For each manipulation data set DS, a condition for determining a timing at which transmission of the manipulation data set DS is to be started (hereinafter referred to as manipulation starting condition) is set. This manipulation starting condition is a condition relating to the progress of processing executed by the target apparatus 40. Especially, in the following description, it is assumed that the manipulation starting condition is a condition relating to contents of a video to be displayed on the screen of the display apparatus 41 by the target apparatus 40. For example, the manipulation starting condition may be a condition relating to a position of an object such as a cursor displayed in the video like that a cursor of a predetermined shape advances into a predetermined region or that the cursor overlaps with a predetermined object. Alternatively, the manipulation starting condition may be a condition relating to presence or absence of a predetermined object like that a predetermined object appears in a video or that the predetermined object disappears from the video.

It is assumed that the control apparatus 30 decides whether or not the manipulation starting condition is satisfied by analyzing a captured image of the camera 36. In particular, in the predetermined manipulation reproduction mode, it is assumed that a video obtained when the camera 36 connected to the control apparatus 30 captures a screen image of the display apparatus 41 continues to be inputted to the control apparatus 30. In the case where the control apparatus 30 decides that the manipulation starting condition is satisfied as a result of analysis of the captured image, the control apparatus 30 starts transmission of a series of manipulation data D included in a manipulation data set DS associated with the manipulation starting condition.

Figure 5:
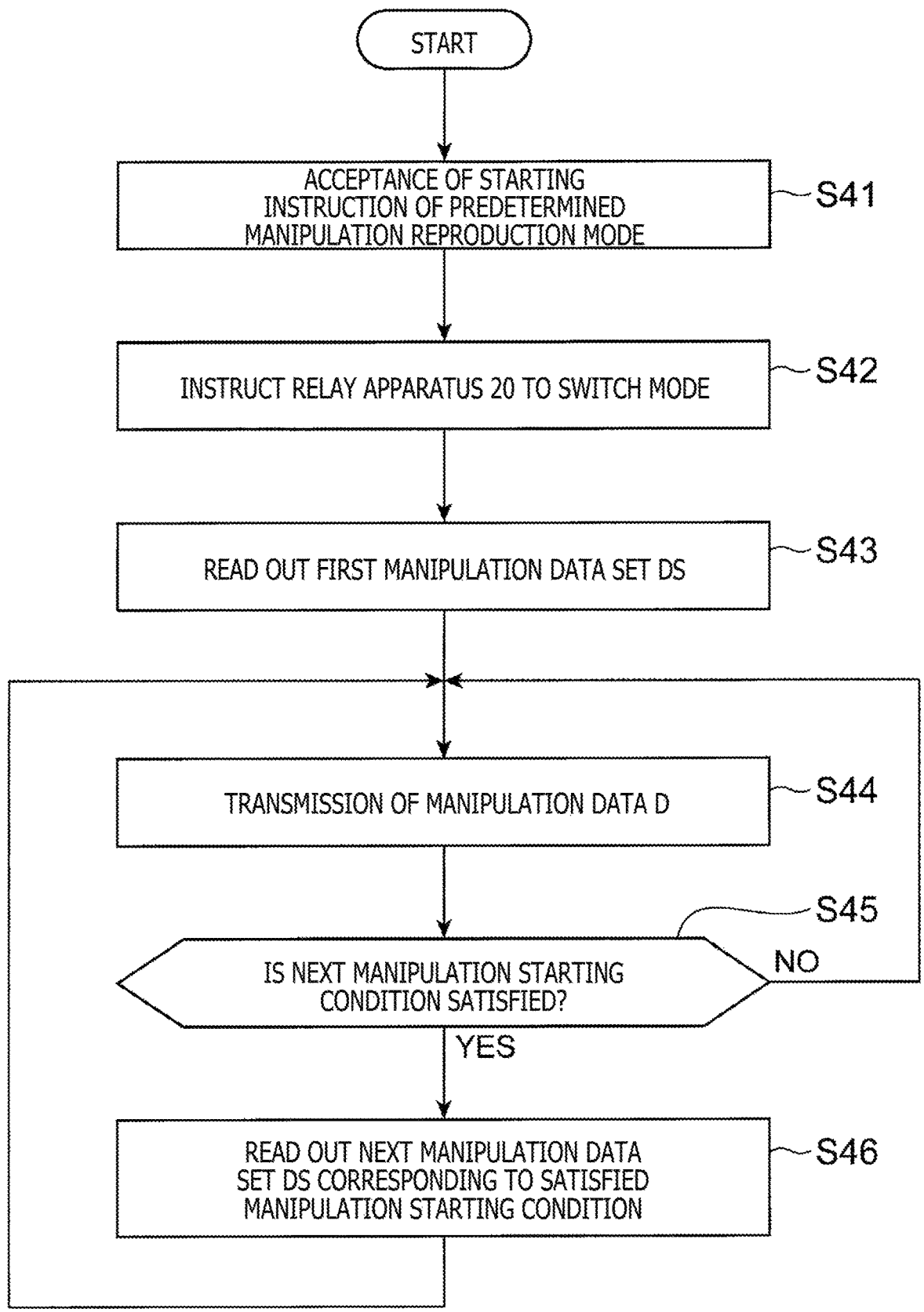
FIG. 5 is a sequence diagram depicting a flow of processing in a predetermined manipulation reproduction mode.

In the following, a flow of processing executed by the control apparatus 30 in the predetermined manipulation reproduction mode is described with reference to a flow chart of FIG. 5. First, if the control apparatus 30 accepts a starting instruction of the predetermined manipulation reproduction mode from a user (S41), then the control apparatus 30 transmits a control command for the instruction of mode switching to the relay apparatus 20 similarly as in the case of the record reproduction mode (S42).

Thereafter, the control apparatus 30 reads out a manipulation data set DS that is to be made a transmission target first (S43). This first manipulation data set DS is a manipulation data set DS whose transmission is to be started unconditionally while a manipulation starting condition is not set. The first manipulation data set DS may be a manipulation data set DS that includes manipulation data D that indicates that no manipulation is performed by the user. Alternatively, the first manipulation data set DS may be a manipulation data set DS that includes manipulation data D of contents indicative of a distance in order to move a cursor, a character or the like appearing on a screen image in a predetermined direction.

After the first manipulation data set DS is read out, the control apparatus 30 starts transmission of the manipulation data D in accordance with contents of the manipulation data set DS (S44). Similarly as in the record reproduction mode, transmission of manipulation data D is executed at acquisition intervals T.

The control apparatus 30 starts analysis of a video inputted from the camera 36 in parallel to the transmission of manipulation data D. In particular, the control apparatus 30 analyzes individual frame images that configure the video inputted from the camera 36 to decide whether or not a manipulation starting condition associated with the manipulation data set DS to be transmitted next is satisfied (S45). While the manipulation starting condition remains not satisfied, the control apparatus 30 returns the processing to S44 to continue transmission of manipulation data D based on the current manipulation data set DS. On the other hand, in the case where the manipulation starting condition is satisfied, the control apparatus 30 reads out next manipulation data set DS corresponding to the manipulation starting condition (S46) and starts a transmission process based on the manipulation data set DS. For example, in the case where a manipulation data set DS for reproducing such manipulation contents that a determination button is depressed to wait for a change of the screen image is associated, for example, with a manipulation starting condition that the cursor advances into a predetermined region, the control apparatus 30 starts a transmission process of the manipulation data set DS at a timing at which it is decided that the cursor actually advances into the predetermined region through the analysis of the captured image of the camera 36. Consequently, contents of such a reproduction target manipulation that the user moves the cursor into the predetermined region and depresses the determination button can be reproduced.

The control apparatus 30 repeats the processes described above until an ending condition determined in advance is satisfied. The ending condition here may be, for example, a condition that is to be satisfied by the captured image of the camera 36 similarly to the manipulation starting condition. Otherwise, operation of the predetermined manipulation reproduction mode may be ended in a state in which the transmission process based on all manipulation data sets DS prepared in advance is completed.

In the predetermined manipulation reproduction mode, the inputting apparatus 10 operates similarly as in the record reproduction mode. In particular, in the case where a mode changing instruction is accepted from the relay apparatus 20, the inputting apparatus 10 thereafter stores manipulation data D transmitted thereto from the control apparatus 30 through the relay apparatus 20 temporarily into the memory 13 in place of generating manipulation data D by itself and transmits the manipulation data D in response to a acquisition request R1 from the target apparatus 40. In other words, the inputting apparatus 10 does not make distinction between the record reproduction mode and the predetermined manipulation reproduction mode and implements a function of transmitting manipulation data D transmitted thereto from the control apparatus 30 through the relay apparatus 20 one by one to the target apparatus 40 in any of the record reproduction mode and the predetermined manipulation reproduction mode.

In the predetermined manipulation reproduction mode, the relay apparatus 20 also operates basically similarly as in the record reproduction mode. In particular, in the case where an instruction to start operation in the predetermined manipulation reproduction mode is received from the control apparatus 30, the relay apparatus 20 transmits a controlling command for the instruction to change the mode to the inputting apparatus 10 and thereafter transmits, as a response R6 to the response R2, manipulation data D received from the control apparatus 30 in order to the inputting apparatus 10.

However, different from the case of the record reproduction mode, in the predetermined manipulation reproduction mode, the relay apparatus 20 need not buffer manipulation data D received from the control apparatus 30 until the number of the manipulation data D reaches the predetermined number. This is because, although it is important in the record reproduction mode to transmit all of recorded manipulation data D without a miss in an order similar to that upon recording, in the predetermined manipulation reproduction mode, it is emphasized that, after the manipulation starting condition is satisfied, the manipulation data D corresponding to the condition be transmitted without a delay. If the relay apparatus 20 otherwise buffers a plurality of manipulation data D, then the period of time after the manipulation starting condition is satisfied until the manipulation data D corresponding to the condition are inputted to the target apparatus 40 undergoes a delay by a period of time until the buffered manipulation data D are sequentially sent out. Therefore, in the predetermined manipulation reproduction mode, the relay apparatus 20 does not buffer the manipulation data D, and in the case where the relay apparatus 20 receives an instruction to start the predetermined manipulation reproduction mode, it issues an instruction to switch the mode to the inputting apparatus 10 immediately at a next timing and thereafter transfers manipulation data D received from the control apparatus 30 in order to the inputting apparatus 10. This makes it possible to input, in the case where the manipulation starting condition is satisfied, manipulation contents suitable for the situation to the target apparatus 40 without a delay.

As described above, in the predetermined manipulation reproduction mode, by analyzing a video displayed on the display apparatus 41 and transmitting manipulation data D prepared in advance at a timing determined in accordance with a result of the analysis, various manipulations can be reproduced at timings according to an actual progress of processing executed by the target apparatus 40. More particularly, according to the predetermined manipulation reproduction mode, it is possible to reproduce such a sequence of manipulations as to move the cursor to a position at which a predetermined menu item is displayed, perform a selection manipulation of the menu item and then select a different menu item after the screen image is changed without depending upon an actual manipulation of the user.

It is to be noted that, although it is described here that a captured image of the camera 36 is analyzed to decide whether or not a manipulation starting condition is satisfied, the method for deciding that the manipulation starting condition is satisfied is not limited to such a method as described above. For example, the control apparatus 30 may accept a video signal same as that supplied to the display apparatus 41 from the target apparatus 40 and analyze contents of the video signal. Anyway, where the target apparatus 40 acquires a video displayed on the screen of the display apparatus 41 as a result of processing and decides on the basis of a result of analysis of the acquired video whether or not the manipulation starting condition is satisfied, the control apparatus 30 can start a transmission process of a manipulation data set DS corresponding to an execution result of the process by the target apparatus 40 without causing the target apparatus 40 to execute an additional process.

With the information processing system 1 according to the embodiment of the present technology described above, it is possible to cause the target apparatus 40 to execute a process in the case where a manipulation of a user is reproduced without having an influence on an operation environment of the target apparatus 40.

It is to be noted that the embodiment of the present technology is not limited to that described above. For example, although it is described in the foregoing description that the information processing system 1 can operate in both of the record reproduction mode and the predetermined manipulation reproduction mode, it may otherwise be configured so as to implement one of the functions. It is to be noted that, in the case where the information processing system 1 operates only in the predetermined manipulation reproduction mode, it need not operate in the manipulation recording mode either.

Further, in the foregoing description, the inputting apparatus 10 and the control apparatus 30 are connected to each other through the relay apparatus 20 such that transmission and reception of manipulation data D are performed through the relay apparatus 20. However, this is not restrictive, and the inputting apparatus 10 and the control apparatus 30 may otherwise be connected directly to each other. In this case, the relay apparatus 20 may be not necessitated, and at least part of the processes executed by the relay apparatus 20 in the foregoing description are executed by the control apparatus 30.

Further, although it is described in the foregoing description that the target apparatus 40 is an information processing apparatus that executes processing of a game or the like independently, this is not restrictive, and the target apparatus 40 may be configured from a combination of a server apparatus and a client apparatus connected for communication to each other. As a particular example, a server apparatus and a client apparatus may be connected to each other through a communication network such as the Internet such that the server apparatus provides a service of a cloud game or the like. In this case, the client apparatus to which the inputting apparatus 10 is directly connected transmits a processing request according to contents of manipulation data D accepted from the inputting apparatus 10 to the server apparatus, receives image data and so forth indicative of a result of processing executed by the server apparatus in response to the processing request and displays the image data on the display apparatus 41 to present the image data to the user. Also in this case, with the information processing system 1 according to the present embodiment, the manipulation of the user can be reproduced without having an influence on the load to the client apparatus, communication between the client apparatus and the server apparatus and so forth.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system, comprising:
an inputting apparatus connected to a target apparatus that executes a process according to a manipulation of a user; and
a control apparatus connected to the inputting apparatus, wherein
the control apparatus receives and records a plurality of manipulation data from the inputting apparatus while the user performs input operations for the target apparatus, wherein said manipulation data corresponds to the input operations;

the control apparatus subsequently transmits the plurality of recorded manipulation data to the inputting apparatus in order one by one, and the inputting apparatus transmits in order one by one the manipulation data received from the control apparatus to the target apparatus at time intervals corresponding to time intervals at which the input operations were accepted when the target apparatus executed a process according to the previously performed input operations.

2. The information processing system according to claim 1, wherein the inputting apparatus accepts an acquisition request periodically transmitted from the target apparatus and transmits one manipulation data transmitted from the control apparatus to the target apparatus every time the acquisition request is accepted.

3. The information processing system according to claim 1, wherein the inputting apparatus includes a manipulation member that is to be a target of a manipulation by the user, and operates in one of a plurality of operation modes at least including a manipulation recording mode in which the inputting apparatus accepts a manipulation of the user for the manipulation member and transmits manipulation data indicative of contents of the manipulation to both of the target apparatus and the control apparatus, and a record reproduction mode in which the inputting apparatus transmits the manipulation data transmitted from the control apparatus to the target apparatus.

4. The information processing system according to claim 3, wherein the control apparatus records a plurality of manipulation data received from the inputting apparatus in the manipulation recording mode, and transmits, in the record reproduction mode, the plurality of manipulation data recorded in the manipulation recording mode to the inputting apparatus one by one in an acceptance order.

5. The information processing system according to claim 1, further comprising:

a relay apparatus that is connected to the control apparatus and the inputting apparatus and relays transmission and reception of data between the control apparatus and the inputting apparatus, wherein the relay apparatus temporarily stores a plurality of manipulation data transmitted from the control apparatus and transmits the stored manipulation data in order one by one to the inputting apparatus.

6. The information processing system according to claim 5, wherein the data transmission rate between the inputting apparatus and the relay apparatus preferably is equal to or higher than the data transfer rate between the inputting apparatus and the target apparatus.

7. The information processing system according to claim 6, wherein the inputting apparatus transmits the same manipulation data in parallel to both of the target apparatus and the relay apparatus.

8. The information processing system according to claim 1, wherein the control apparatus starts a process for transmitting the plurality of manipulation data recorded in advance to the inputting apparatus at a timing that depends upon a progress of the process being executed by the target apparatus.

9. The information processing system according to claim 8, wherein the control apparatus acquires a video to be displayed by the target apparatus and determines the timing on a basis of a result obtained by analyzing the acquired video.

10. The information processing system according to claim 1, wherein the manipulation data received by the inputting apparatus from the control apparatus, and which is transmitted to the target apparatus, causes the target apparatus to execute a process according to the input operations corresponding to the manipulation data.

11. An inputting apparatus that is connected to a target apparatus that executes a process according to a manipulation of a user and a control apparatus, the inputting apparatus, comprising:

a receiver that receives a plurality of manipulation data prepared in advance and individually indicative of manipulation contents of the user in order one by one from the control apparatus, and a transmitter that transmits the manipulation data transmitted from the control apparatus to the target apparatus in order one by one at time intervals corresponding to time intervals at which, in a case where the target apparatus executes a process according to a manipulation of the user, contents of the manipulation are accepted, wherein the control apparatus previously received and recorded the plurality of manipulation data from the inputting apparatus while the user was performing input operations for the target apparatus, wherein said manipulation data corresponds to the input operations, the control apparatus transmits at least some of the plurality of the recorded manipulation data to the inputting apparatus via the receiver in order one by one, and the inputting apparatus transmits in order one by one the manipulation data received from the control apparatus to the target apparatus at time intervals corresponding to time intervals at which the input operations were accepted when the target apparatus executed a process according to the previously performed input operations.

12. A control apparatus connected to an inputting apparatus connected to a target apparatus that executes a process according to a manipulation of a user, the control apparatus comprising:

a transmitter for transmitting a plurality of manipulation data prepared in advance and individually indicative of manipulation contents of the user to the inputting apparatus in order one by one, wherein the transmitter transmits the plurality of manipulation data in order at time intervals corresponding to time intervals at which, in a case where the target apparatus executes a process according to the manipulation of the user, contents of the manipulation are accepted, wherein the control apparatus previously received and recorded the plurality of manipulation data from the inputting apparatus while the user was performing input operations for the target apparatus, wherein said manipulation data corresponds to the input operations, the control apparatus transmits via the transmitter at least some of the plurality of the recorded manipulation data to the inputting apparatus in order one by one, and the inputting apparatus transmits in order one by one the manipulation data received from the control apparatus to the target apparatus at time intervals corresponding to time intervals at which the input operations were accepted when the target apparatus executed a process according to the previously performed input operations.

13. An information processing method executed by a system comprising a control apparatus connected to an inputting apparatus connected to a target apparatus that executes a process according to a manipulation of a user, the information processing method comprising:
- by the control apparatus, receiving and recording a plurality of manipulation data while the user performs input operations for the target apparatus, wherein the manipulation data corresponds to the input operations;
- by the control apparatus, transmitting the plurality of manipulation data in order one by one to the inputting apparatus;
- by the inputting apparatus transmitting the manipulation data received in order one by one to a target apparatus at time intervals corresponding to time intervals at which the input operations were accepted when the target apparatus executed a process according to the previously performed input operations.

14. A non-transitory, computer readable storage medium containing a computer program, which when executed by a system comprising a computer, a control apparatus connected to an inputting apparatus connected to a target apparatus that executes a process according to a manipulation of a user, where the computer program causes the system to carry out actions, comprising:
- by the control apparatus, receiving and recording a plurality of manipulation data while a user performs input operations for a target apparatus, wherein the manipulation data corresponds to the input operations;
- by the control apparatus, transmitting the plurality of manipulation data prepared in advance and individually indicative of manipulation contents of the user to an inputting apparatus in order one by one,
- by the inputting apparatus transmitting the manipulation data received in order one by one to the target apparatus at time intervals corresponding to time intervals at which the input operations were accepted when the target apparatus executed a process according to the previously performed input operations.

* * * * *